United States Patent Office 3,265,465
Patented August 9, 1966

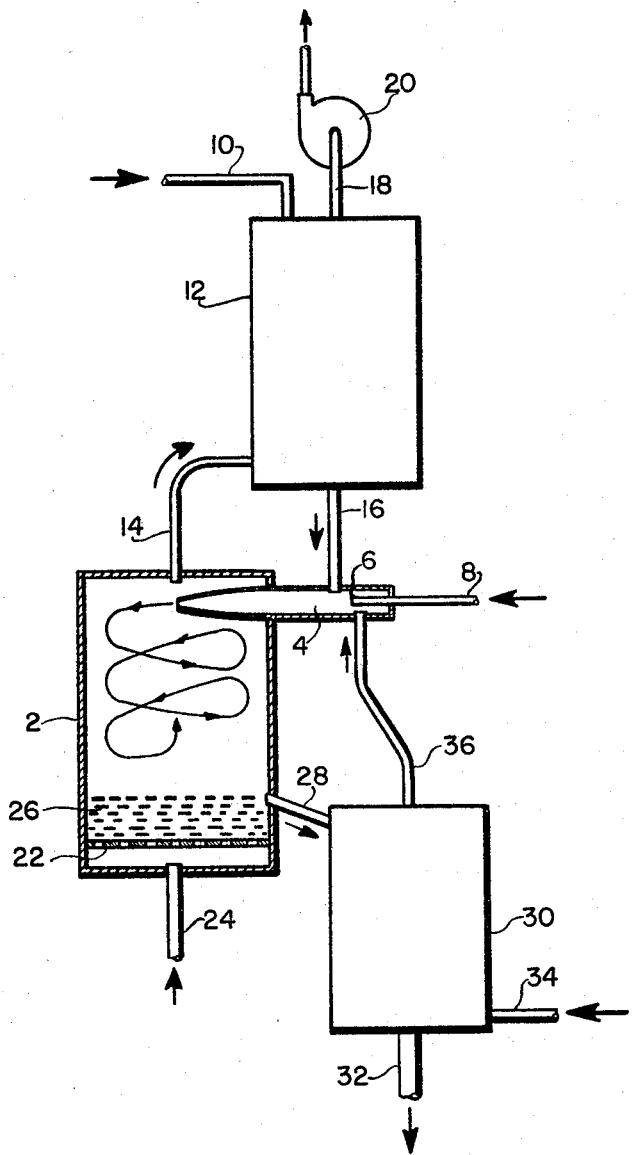

3,265,465
PRODUCTION OF ANHYDROUS ALUMINA
Gilbert Turpin, Sainte-Foy-Les-Lyon, France, assignor to Societe d'Electro-Chimie d'Electro-Metallurgie et des Acieries Electriques d'Ugine, Paris, France, a corporation of France
Filed Dec. 7, 1964, Ser. No. 418,382
Claims priority, application France, Apr. 28, 1961, 860,224, Patent 1,295,554
6 Claims. (Cl. 23—142)

This application is a continuation-in-part application of my application Serial No. 186,187, filed April 9, 1962, and now abandoned.

This invention relates to production of anhydrous alumina.

In industry, various anhydrous aluminas are used. Some of these anhydrous aluminas are amorphous and their high specific surface renders them useful as absorbing agents, catalyst supports, etc. Other aluminas are crystallized and include particularly alpha alumina or corundum, which is the crystallized form at a high temperature. This alpha alumina is used as abrasives, polishing materials, catalyst supports, etc. Beside the amorphous aluminas and the alpha alumina or corundum thoroughly crystallized in the hexagonal system (rhombohedric), other forms are known, wherein the structure is only partially crystallized and wherein there are other crystalline or amorphous forms beside the alpha form. Thus, each consumer may find a product the specific qualities of which correspond to the requirements of his use. For instance, the alumina used to feed electrolysis cells for making aluminum is an anhydrous alumina having an alpha alumina content between 70% and 95% and is generally obtained by a calcination in the presence of a mineralizing agent which gives it a starchy or floury appearance desired by the consumers to feed the electrolysis cells.

Various anhydrous aluminas are often obtained from alumina trihydrate or hydrargillite, which results from the decomposition of sodium aluminate solutions. The hydrargillite corresponds to the formula $Al_2O_3.3H_2O$ and in addition to the 3 mols of constitution water, the industrial product contains non-combined water or moisture.

The alumina hydrate is heated to temperatures which depend upon the characteristics of the product to be formed and may reach 1200° C. The duration of the heating and the method for carrying out this heating have an important effect upon the characteristics of the product obtained.

In general, a short duration of heating and/or a heating at a moderate temperature, for instance below 1000° C., leads to non-crystallized anhydrous aluminas, for instance to aluminas with a high specific surface. Thus, the U.S. Patent 2,915,365 describes a process for obtaining amorphous activated alumina having a high adsorption property in regard to water-vapour. This process includes a rapid heating, the duration of which may vary from a fraction of a second to 10 seconds, at a temperature between 400° C. and 1000° C. This process also includes a preheating of the trihydrate with the gases from the main apparatus, a separation of the predried product and the gases, and completion of the dehydration within the very short prescribed time, by the entrainment of the predried product in a cylindro-conical apparatus through the effect of hot gases. The final product and the partially cooled down gases are thereafter separated from one another in the cylindro-conical apparatus. A feature of this process is obtention of an alumina which has a high adsorption property, which is amorphous and the residual water content of which is between 0.02 and 0.32 mol $H_2O$ per mol $Al_2O_3$, i.e., 0.3 to 4.8% water by weight.

When a partially or thoroughly crystallized alumina in the alpha form is wanted heating is raised to a temperature above 900° C. for a time which is lower and lower as the temperature is higher than 900° C. According to such processes, the trihydrate undergoes a dehydration and a recrystallization in the alpha form and other intermediary transformations may take place. For instance, when hydrargillite is subjected to higher and higher temperatures, its incomplete passing through the boehmite phase, $Al_2O_3.H_2O$, is observed. Then after dehydrating, a transition alumina is obtained which generally is difficult to define and approximates an alumina designated gamma alumina which can be still present up to about 1000° C.– 1200° C. However, at these temperatures, the stable alumina is the alpha alumina; the transformation of the gamma alumina into alpha alumina is a slow exothermic transformation. This last transformation can also take place at a lower temperature and/or more rapidly if a mineralizing agent or a catalyst such as the aluminum fluoride is mixed with the alumina.

Generally speaking, the dehydration and the calcination of hydrate are carried out in rotary furnaces (or kilns) slightly inclined, the length of which varies from 80 to 120 meters for the daily production of 300 to 500 tons of calcined alumina.

The alumina is introduced in a wet state at one end of the furnace and is displaced, due to the rotation of the latter, towards the lower end where the heat source is placed.

It is well known that this use of the rotary furnace is not fully satisfactory. Indeed, during the dehydration, alumina is likely to "rush," and insufficiently dehydrated product may reach the heating zone, and even the furnace outlet. This involves irregularities in the degrees of dehydration and calcination of alumina, as also in the flow of alumina at the furnace outlet. This last phenomenon is usually called by the name of "slipping" or "avalanche." In order to avoid these drawbacks and to obtain well calcined alumina at the same time, one is led to extend the heated zone, but the forming of alumina nodules having a diameter which may reach several centimeters, and which disturb the functioning of cooling devices, may then be observed.

After having passed through the heated zone and having reached a temperature near to 1200° C. at which it is maintained for a long time, the alumina leaves the furnace and goes through a more or less complex cooling system, with the aim of lowering its temperature to a value of less than 100° C. In general, one endeavors to recuperate, during this cooling, a part, if not the total, of the sensible heat of this alumina. Generally one thus warms the secondary combustion air. Consequently, the temperature of the flame is increased, which is not without drawbacks for the life of the lining of the furnace, and which makes the forming of alumina nodules easier.

However, the yield of these cooling and heat recuperation installations is very often rather poor and rarely exceeds 50%. In the best modern furnaces, producing an alumina having an alpha alumina content of more than 80%, the heat consumption corresponding to the alumina calcination is in the neighborhood of 125 kg. of fuel oil per metric ton of calcined alumina, i.e., approximately 1200 Kcal. per kg. of alumina, which corresponds to a thermic yield of about 46% in relation to the theoretical demands calculated at 25° C. It is true that some progress can still be made, in particular by increasing the capacity of the furnaces by making them longer, but one encounters the difficulties of exploiting a very long furnace and this solution does not give entire satisfaction.

To produce various anhydrous aluminas, processes and apparatus requiring fluidized beds have been proposed. In particular, for production of gamma alumina, several fluidized beds through which alumina hydrate passes successively in countercurrent flow to an uprising gas stream have been proposed.

Fuel is burned in one or several successive beds in order to attain a maximum wanted temperature in one of the lower beds and such bed is often used to preheat the air for combustion of the fuel. These processes have a very good utilization of heat, but as said in U.S. Patent 2,833,-622, column 2, lines 10–12, these processes have not given good results in production of alpha alumina. On the one hand, the water-vapour given off during the process varies considerably the volume of the uprising gaseous stream, which makes the maintenance of satisfactory fluidizing conditions in each successive bed difficult. On the other hand, owing to the slowness of the crystallization phenomenon and in order to maintain the residence time in the successive beds at the required amount and the heights of the successive beds at amounts compatible with one another, one is obliged to use a catalyst in the bed where the recrystalization takes place. Then a clogging of the conduits ensuring the passage of the gas and the solid from one bed to another bed occurs. This phenomenon disturbs the working of the apparatus and renders this kind of process unusable. Another drawback of fluidized beds is the large size of the apparatus which is necessary for the fluidized beds require uprising flows with a moderate speed and the heat carried by these flows of moderate speed is low. Consequently, large size apparatus must be employed for a given production and the assembly of this apparatus is expensive.

To produce partially or entirely crystallized alpha alumina, dehydration and recrystallization have been carried out in separate enclosures.

In Du Bellay et al. application Serial No. 329,344, filed December 5, 1963, a process which does not require the fluidized beds, at least for the dehydration is described. This process comprises operating in two successive, fundamentally different and separate stages:

(1) An endothermic stage, during which the alumina trihydrate is dried and practically completely dehydrated in a few seconds at a temperature of about 1100 to 1200° C.

(2) An exothermic stage during which the product obtained from this first stage is maintained in an insulated cylindrical chamber for a period of time sufficient to allow its transformation into alpha crystallized alumina or corundum.

That application also describes appropriate devices for putting into operation said processes and which comprises:

(1) For the endothermic stage, a device comprising a series of heat exchange cyclones arranged in cascade formation, equipped with burners as a source of heat and in which the dehydration is effected by counter-current flow of solid and gas.

(2) For the exothermic stage, any thermally insulated recrystallization enclosure in which the temperature of the alumina is maintained stable, this enclosure being either a rotary kiln of a conventional type, or a cylindro-conical tower with a fluidized moving bed, in which the alumina flows continuously by gravity or again a chamber with a fluidized bed.

(3) For the cooling of the alumina issuing from this second stage, an assembly of rotary tubes or cyclones, a part of the total of the heat recuperated by the cooling air being utilized as a secondary air for the burners of the first stage.

These devices, whilst providing a clear improvement as compared with the known rotary furnace, have nevertheless some disadvantages:

(a) It is necessary to have a temperature of 1050 to 1200° C. to cause the exothermic recrystallization reaction; this involves a previous heating of the thermally insulated enclosure when starting up the installation, either with the aid of a subsidiary burner, or, which requires a longer period of time, by the alumina itself coming from the first stage of the process.

(b) The exothermic reaction being started, this latter constituting a supply of heat corresponding to a total temperature rise of the order of 300° C., one could fear that not all of the alumina would be brought to a temperature of the order of 1350 to 1500° C.; in fact, this supply of heat is rather progressive, except in the presence of certain mineralizing agents, the use of which is known, and which suddenly free about a third of the recrystallization heat. It thus results that, according to whether the temperature in the chamber containing the alumina is higher or lower than a value varying around 1100° C. according to conditions, there is a sudden freeing of a large portion of the recrystallization heat or not. The working of the recrystallization chamber therefore presents an instability zone, where the reaction can stop suddenly.

(c) The recuperation of the sensible heat of the alumina by the air which is to be used for the combustion, has the effect of increasing the flame temperature of the burners. To meet this inconvenience, which can be dangerous for the stability of the refractories, one is led to increase the air input to the recuperator. This increased air input certainly facilitates the transfer of the alumina from one exchanger to the other in the endothermic stage. It also facilitates the recuperation of the sensible heat of the outgoing calcined alumina. Lastly, it avoids overheating, but it increases heat losses by the smoke as well as energy consumption by the exhaust fans.

(d) The construction of the plant in such distinct units as a first heat exchanger for the dehydration of the alumina, a combustion chamber, a recrystallization chamber, a final heat exchanger for the recuperation of the sensible heat of the alumina well separates the operations and allows one to design independently the dimension of each apparatus, but it results in a complex installation.

In another process described in Roberts et al. U.S. Patent 2,833,622, fluidized beds are necessary to ensure the dehydration. Thereafter, the product is sent into a second reactor with a fluidized bed in which aluminum fluoride is added to it. The gases passing through this fluidized bed are carefully kept apart from the fluidized beds in which the dehydration is carried out and are directed to an installation comprising a heat exchanger in which condenses the aluminum fluoride carried away by the gases which have passed through the catalytic conversion bed. Such a process avoids clogging the dehydrating beds but uses a complex installation for recovery of the catalyst.

This invention relates to production of an anhydrous alumina, partially crystallized in the alpha form from alumina trihydrate. A main characteristic of the invention is making the completion of the dehydration and making the calcination or conversion into alpha alumina in two parts of a single enclosure which forms a combustion chamber. The two parts are not separated by a thermal screen.

Another characteristic of the invention is a partial dehydration of the product before entry into the enclosure.

Another characteristic of the invention is that heat is given off during combustion of gases in contact with this partially dehydrated product which is carried away in a dispersed state by the gases during their combustion.

Another characteristic of the invention is a thermal exchange between an upper portion of the combustion chamber which is mainly filled with hot gases and a lower portion of the chamber which is mainly filled with the product during its recrystallization into the alpha form. There is also a thermal exchange between the gases and the solid.

The process of the invention comprises a first stage for preheating the alumina trihydrate by hot gases coming from the main stage of the process. This first stage may be carried out in any device which permits use of such gases; however, a system with cyclones is preferred.

According to the invention process, the preheating is carried to remove beside the moisture, a portion of its constitution water to obtain a product containing only about 5 to 30% of its initial constitution water.

Then, the predried product is introduced into a flow of hot incompletely burned gases which carry away the product. As shown in the accompanying drawing which shows diagrammatically apparatus for use in the invention, the predried product is introduced adjacent the discharge end of the burner 6. In this case, the most of the combustion heat is given off in the main apparatus. But this predried product can also be introduced into the hot air feeding the burner through conduit 36. The burner flame is located in the inlet to the main apparatus in which the whole combustion heat is given off.

According to the invention process, the product projected by the gases introduced tangentially into a cylindrical apparatus forming a combustion chamber, and the combustion gases describe helical descending movements during which dehydration of the alumina is completed. The alumina descending along the vertical walls of the said combustion chamber following helical descending paths is collected on the bottom of the combustion chamber.

Thereafter, the product is maintained at the lower portion of the combustion chamber in the state of a fluidized bed during a period necessary for converting the alumina into an alpha crystallized alumina. To obtain the fluidized bed, a subsidiary air stream is sent upwards through the product at the lower portion of the combustion chamber; this air may be heated or not. It has a velocity sufficient to maintain this layer in the state of a fluidized bed. A heat exchange between this fluidized bed and the hot gases above the bed cooperates with the heat given off by the alumina conversion to maintain the bed at a temperature between 1000° C. and 1250° C.

If a mineralizing agent such as aluminum fluoride, is added to the bed and carried away by the gases in the form of volatile fluorinated compounds, these latter are retained by the solid in the preheating apparatus, and directed back towards the bed by the solid entering the bed. Thus, this mineralizing agent is recycled without any subsidiary recuperator being used.

In the process, the gases which completely burn in the combustion chamber following helical descending paths reascend to the upper portion of this chamber and are then used as a heating agent of the product during its preheating.

Finally, the crystallized product is removed from the fluidized bed by overflowing and it is preferably used as a heating agent for the air fed to the burner.

The preheated and partially dehydrated alumina which is carried away by the burner flame takes, together with this flame, a helically descending movement, during which the alumina completes its dehydration. This helical movement brings the alumina towards the vertical cylindrical wall of the combustion chamber along which it comes to rest at the bottom. The combustion gases, slowed down in their rotating movement by the friction against the wall, reascend the centrifugal force field and emerge from the chamber at its upper part and are fed to the device for preheating and partially dehydrating the alumina.

The temperature of the flame of the burner is considerably reduced by the presence of partially dehydrated alumina, which is, originally, less hot than the flame; thereby, the refractories which line the wall of the combustion chamber are subjected to a less high temperature. Besides, the refractories are protected by the alumina which, maintained by the centrifugal force, goes down the wall. Thus, one can use, as combustion air for the burner, the recuperated hot air coming from the final recuperating device, without the risk of high temperatures and a rapid deterioration of the refractories.

The arrangement of the fluidized bed in the lower part of the combustion chamber allows, moreover, a reciprocal heat exchange between the substance constituting the bed and the gases which are above the bed. This exchange makes it easier at the start to reach the normal working conditions and stabilizes the exothermic recrystallization operation.

The degree of dehydration of the alumina fed to the combustion chamber may vary within a wide range. It is preferably comprised between 70 and 95%.

The apparatus comprises a vertical cylindrical enclosure forming a combustion chamber, provided with a tangential pipe at its upper part into which a burner is inserted, the burner flame carrying away the partly dehydrated preheated alumina, the combustion chamber containing the material to be calcined at its lower part, in the form of a fluidized bed maintained in this state by a suitable gaseous current; the combustion chamber is connected, on the one hand, to a device for preheating and partially dehydrating alumina by means of heated gases coming out of the combustion chamber. The combustion chamber also is connected to a recuperator for recuperating the sensible heat of the calcined alumina and for preheating the air fed to the burner.

The device for preheating and partially dehydrating alumina and the recuperator may be constituted by elements already known in themselves, for instance by heat exchange cyclones with one or several stages. The thickness of the fluidized bed at the bottom of the combustion chamber is determined according to the desired time of maintaining the alumina at high temperature. For instance, this thickness will vary with the proportion of the wanted alpha phase in the anhydrous product. A mineralizing agent may be added to the alumina.

The apparatus according to the present invention has, among others, the following advantages:

(a) Regularity in the quality of the obtained alumina;
(b) Regularity in the outflow from the combustion chamber of the alumina;
(c) It has no moving parts.

These advantages allow, in particular, to obtain at will alumina having dehydration and calcination degrees of a given quality. The regularity in the flowing explains partly the previous advantage, but it also results in a great regularity in the working of the heat recuperator. The apparatus results in the suppression of joints, simplifies the tightness problems, allows the use of light and effective heat insulators and makes the controlling and regulating measures easier.

The accompanying drawing illustrates, in a diagrammatic manner, apparatus according to the invention.

The apparatus comprises a vertical cylindrical enclosure or combustion chamber 2, provided at its upper part with a tangential pipe 4 which is horizontal or slightly inclined. A burner 6 is located in the pipe 4, the burner being supplied with fuel through a pipe 8. The alumina trihydrate is supplied through a pipe 10 to a preheating device 12 for preheating and partially dehydrating it. The combustion gases escape from the combustion chamber 2 through a conduit 14 connected to the top of the combustion chamber and are led to the preheating device 12. The partially dehydrated alumina coming from the preheater 12 is introduced through a pipe 16 into the pipe 4. The alumina, together with the flame, takes a helically descending path along the cylindrical wall of the combustion chamber, thereby completing its dehydration, and comes to rest at the bottom of the combustion chamber. The combustion gases are slowed down in their rotating movement by friction against the wall of the combustion chamber and reascend the centrifugal force field and emerge from the combustion chamber through the conduit 14. The gases introduced into the preheater 12 through the conduit 14, after passing through the preheater and being cooled therein, are exhausted through a conduit 18 by an exhaust fan 20.

The combustion chamber 2 is provided at its bottom with a perforated air distributor plate 22 and air is introduced through the conduit 24 into the bottom of the combustion chamber. The alumina deposited in the bottom of the combustion chamber is maintained in the state of a fluid bed 26 by the air fed through the conduit 24. The fluid bed 26 so formed is provided in a sufficient volume to insure that the alumina remains here for the length of time necessary to obtain the desired crystalline structure. The alumina is continuously evacuated by means of any appropriate device 28, for example by overflow or by pneumatic ejection, into a heat recuperator 30 for the recuperation of its sensible heat. The cooled calcined alumina leaves the recuperator 30 through a conduit 32. Combustion air enters through a conduit 34 and after having passed through the recuperator flows through a conduit 36 into the pipe 4 where it maintains combustion of the fuel fed through the conduit 8.

The following non-limitative examples further illustrate the invention.

*Example 1*

A calcination installation comprised:
(1) A vertical cylindrical combustion chamber of 750 mm. inside diameter and 1540 mm. height, heated by fuel oil (calorific value: 9775/Kcal./kg.). at the rate of 10 kg./h. and supplied with air at the rate of 177 kg./h. (at the level of the burner);
(2) A preheater for alumina trihydrate constituted by three cascade assembled cyclones of 300 mm. diameter;
(3) A recuperator constituted by two cyclones of 200 mm. diameter.

The fluidized bed of alumina in the combustion chamber had a height of 300 mm. and, taking into consideration the distribution box for the fluidization gases, left a height of 1 meter for the combustion gases; the air input necessary for the fluidization was 20 kg./h.

This installation was fed with moist alumina trihydrate at 10.1% free water at the rate of 170 kg./h., which corresponds to an input of 100 kg. $Al_2O_3$/h. The fumes escaping from the preheater 12 through conduit 18 had a temperature of 317° C.; they carried away about 5 kg./h. of alumina, whereas 95 kg./h. of alumina analyzing 80% corundum came out of the recuperator 30 through conduit 32 at a temperature of 225° C. This working condition corresponded to a fuel consumption of 100 kg. per metric ton of entering $Al_2O_3$ (i.e., 978 Kcal. $Al_2O_3$) with an air excess of 44.70%, taking into account the fluidizing air.

*Example 2*

A calcination installation comprised:
(1) The same vertical cylindrical combustion chamber as in Example 1, operating also under the same conditions;
(2) A preheater for alumina trihydrate constituted of two cyclones of 300 mm. diameter;
(3) A recuperator constituted of three cyclones of 200 mm. diameter.

The fluidized alumina bed of the vertical cylindrical combustion chamber had the same operating characteristics as in Example 1.

This installation was fed with moist alumina trihydrate at 10.1% free water at the rate of 207 kg./h., which corresponds to an input of 120 kg. $Al_2O_3$/h. The fumes escaping at 18 from the preheater 12 had a temperature of 210° C.; they carried away about 6 kg./h. of alumina, whereas 114 kg./h. of alumina analyzing 70% corundum left the recuperator 30 at 32 at a temperature of 195° C.

This working condition corresponded to a fuel consumption of 83.5 kg. per metric ton of entering $Al_2O_3$ (i.e., 815 Kcal./kg. $Al_2O_3$) with an air excess of 44.70%, taking into account the fluidizing air.

*Example 3*

A calcination installation comprised:
(1) A vertical cylindrical combustion chamber of 750 mm. inside diameter and 1540 mm. height, heated by fuel oil (calorific value: 9775 Kcal./kg.) and supplied with air at the rate of 135 kg./h. (at the level of the burner);
(2) A preheater for alumina trihydrate constituted by three cascade assembled cyclones of 300 mm. diameter, with a cyclone removing the dust, the collected alumina fines being continuously recycled into this preheater;
(3) A recuperator constituted by two cyclones of 200 mm. diameter.

The fluidized bed of alumina in the vertical cylindrical combustion chamber had a height of 300 mm. and, taking into consideration the distribution box for the fluidizing gases, left a height of 1 meter for the combustion gases; the air input necessary for the fluidization was 35 kg./h.

This installation was fed with moist alumina trihydrate at 10.1% free water at the rate of 170 kg./h., which corresponds to an input of 100 kg. $Al_2O_3$/h. The fumes escaping from the cyclone removing the dust at 18 had a temperature of 200° C.; they carried away about 1.6 kg./h. of alumina, whereas 98.4 kg./h. of alumina analyzing 0.25% $H_2O$ and 7% corundum came out of the recuperator at 32 at a temperature of 300° C. after said alumina remained for about 65 minutes in the fluidized bed at the temperature of 1000° C.

The product coming out from the preheater had a temperature of 600° C. and still contained 25% of the initial constitution water.

This working condition corresponded to a fuel consumption of 93 kg. per metric ton of entering $Al_2O_3$ (i.e. 910 Kcal./kg. $Al_2O_3$) with an air excess of 39%, taking into account the fluidizing air.

*Example 4*

A calcination installation comprised:
(1) The same vertical cylindrical combustion chamber as in Example 3, operating also under the same conditions;
(2) A preheater for alumina trihydrate constituted of three cyclones of 300 mm. diameter with also a cyclone removing the dust, as in Example 3;
(3) A recuperator constituted of three cyclones of 200 mm. diameter.

The fluidized alumina bed of the vertical cylindrical combustion chamber had the same operating characteristics as in Example 3.

This installation was fed with moist alumina trihydrate at 10.1% free water, at the rate of 170 kg./h., which corresponds to an input of 100 kg. $Al_2O_3$/h. A mineralizing agent was introduced into pipe 10 in the form of a solid aluminum fluoride of technical grade at the rate of 0.2% of the alumina weight. The fumes escaping at 18 from the cyclone removing the dust had a temperature of 200° C.; they carried away about 2 kg. of alumina, whereas 98 kg./h. of alumina analyzing 0.15% water and 80% corundum (alpha alumina) came out of the recuperator 30 at 32 at a temperature of 230° C., after said alumina remained for about 65 minutes in the fluidized bed at the temperature of 1100° C.

The product coming out from the preheater had a temperature of 650° C. and still contained 15% of the initial constitution water.

This working condition corresponded to a fuel consumption of 85 kg. per metric ton of entering $Al_2O_3$ (i.e. 865 Kcal./kg. $Al_2O_3$) with an air excess of 53%, taking into account the fluidizing air.

While I have shown and described preferred embodiments of my invention, it may be otherwise embodied within the scope of the appended claims.

I claim:

1. A process for obtaining from alumina trihydrate, an anhydrous alumina which is at least partially crystallized in the form of alpha alumina, the process comprising subjecting alumina trihydrate to a partial dehydration to obtain a partially dehydrated product which contains substantially about 5% to 30% of its initial constitution water, introducing said product into a stream of incompletely burned hot gases, delivering said gases which contain said partially dehydrated product into a substantially cylindrical combustion chamber tangentially of the walls thereof, burning said incompletely burned hot gases in said combustion chamber, forming in said combustion chamber substantially helically descending flows of said gases and imparting to said product substantially helically descending paths, collecting said product in a lower portion of said chamber and there forming a fluidized bed of said product by directing an air stream therethrough, dehydration of said product being substantially completed during its descent to said bed, said bed being in contact with the gases thereabove, maintaining said product in said bed for converting at least a portion thereof into crystallized alpha alumina to form an anhydrous alumina which is at least partially crystallized alpha alumina, a heat exchange being effected between said bed and said gases thereabove, said heat exchange cooperating with heat evolved from said conversion to crystallized alpha alumina to maintain said bed at a temperature substantially about 1000° C. to 1250° C., and recovering said anhydrous alumina which is at least partially crystallized alpha alumina.

2. The process of claim 1 characterized by adding a mineralizing agent to said fluidized bed.

3. The process of claim 1 characterized by introducing said partially dehydrated product into a stream of hot air which is utilized in production of said hot unburned gases.

4. The process of claim 1 characterized by said partially dehydrated product being introduced into said incompletely burned gases adjacent their entry into said combustion chamber.

5. The process of claim 1 characterized by effecting a heat exchange between said anhydrous alumina which is recovered and air to be used in production of said incompletely burned gases.

6. The process of claim 1 wherein said alumina trihydrate is subjected to gaseous products of combustion from said combustion chamber.

References Cited by the Examiner

UNITED STATES PATENTS

| 2,833,622 | 5/1958 | Roberts et al. | 23—142 |
| 2,915,365 | 12/1959 | Saussol | 23—142 |

OSCAR R. VERTIZ, *Primary Examiner.*

MAURICE A. BRINDISI, *Examiner.*

H. T. CARTER, *Assistant Examiner.*

UNITED STATES PATENT OFFICE
CERTIFICATE OF CORRECTION

Patent No. 3,265,465                            August 9, 1966

Gilbert Turpin

It is hereby certified that error appears in the above numbered patent requiring correction and that the said Letters Patent should read as corrected below.

Column 2, line 6, strike out "than"; column 3, line 23, for "recrystalization" read -- recrystallization --; line 67, for "of the total" read -- or the total --.

Signed and sealed this 1st day of August 1967.

(SEAL)
Attest:

EDWARD M. FLETCHER, JR.                    EDWARD J. BRENNER
Attesting Officer                                  Commissioner of Patents